Feb. 10, 1942.  L. E. STONE  2,272,487

MEANS FOR FACILITATING THE FOCUSING OF NEGATIVES

Filed Jan. 28, 1939

INVENTOR.
LAWRENCE E. STONE
BY
*Horace B. Fay*
ATTORNEY.

Patented Feb. 10, 1942

2,272,487

UNITED STATES PATENT OFFICE 2,272,487

MEANS FOR FACILITATING THE FOCUSING OF NEGATIVES

Lawrence E. Stone, Cleveland, Ohio

Application January 28, 1939, Serial No. 253,400

2 Claims. (Cl. 95—9)

This invention relates, as indicated, to means for facilitating the focusing of negatives for enlargement purposes, but has reference more particularly to negatives bearing markings or indicia to be utilized for such purposes.

After a photographic medium has been exposed and developed, the negative is usually enlarged for printing purposes by placing it in a photo-enlarger and projecting, by means of suitable light and lenses, the image of the negative upon projection paper placed upon the easel or baseboard of the enlarger. In order to secure a sharp, clear image the exact focus must be determined and the focusing is accomplished by suitable means provided in the enlarger for this purpose. The paper is then exposed and the print developed in the usual manner.

Unfortunately, however, it is difficult to secure an exact focus by the means provided in the enlarger for this purpose, inasmuch as the projected image is reversed and is the same as the negative, black taking the place of white in the finished print and white taking the place of black. This is especially true in negatives of great density and in negatives of very little density or contrast. In fact, the focusing of such negatives is so difficult that the person doing the enlarging has heretofore resorted to various expedients designed to facilitate focusing.

One of these expedients is a special focusing film having a geometric design at the center thereof, which is first placed in the enlarger and which can be focused more accurately than the negative which is to be enlarged. When the focus of such special film is determined, the film is removed and replaced by the negative to be enlarged. The paper is then exposed and developed as usual. This requires a number of operations, which are time consuming, and sometimes the enlarger is jarred or the negative holder soiled and as a result the enlargement is not always perfect. In addition, this method is awkward and often proves to be only approximate.

The present invention has as its primary object the provision of a negative having means associated therewith for facilitating the focusing of such negatives whereby sharp, clear enlargements may be secured more quickly and efficiently and at less expense than has characterized the use of other expedients heretofore employed for this purpose.

To the accomplishment of the foregoing and related ends, said invention, then, consists of the means hereinafter fully described and particularly pointed out in the claims; the annexed drawing and the following description setting forth in detail certain negatives embodying the invention, such disclosed negatives constituting, however, but a few of the various forms in which the principle of the invention may be used.

Figure 1:
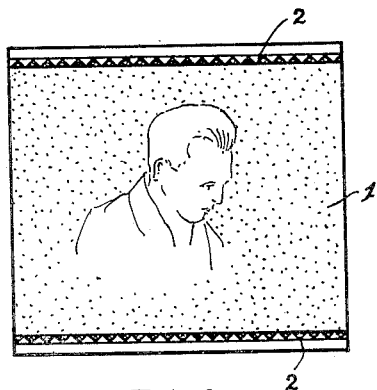
Fig. 1 is a view of a negative bearing a focus-facilitating geometric design adjacent the top and bottom edges thereof, but within the exposure area of the photographic medium from which the negative has been made.

Referring more particularly to Fig. 1, it will be seen that the exposure area 1 of the negative is provided adjacent the top and bottom edges thereof with markings 2 which may be in the form of a series of similar sharply defined geometric designs about $\frac{1}{16}$ of an inch in height. These designs which are on each negative may be sharply focused quickly and much more easily than the image itself on the negative and therefore greatly facilitate the focusing of the negative. An exact and easy method of focusing each negative is thus provided and by this means the negative will always be in correct focus as the means for securing an accurate focus is imprinted or otherwise placed upon each individual negative by the manufacturer.

Since the enlargement can be composed and such portions as may be desired to be omitted may be omitted from the enlargement, the markings on the negative for facilitating the focusing can readily be omitted from the projection by the person making the enlargement and in cases where this cannot be done, the focusing portion can be trimmed from the completed print and thus disposed of in the finished print.

Figure 2:
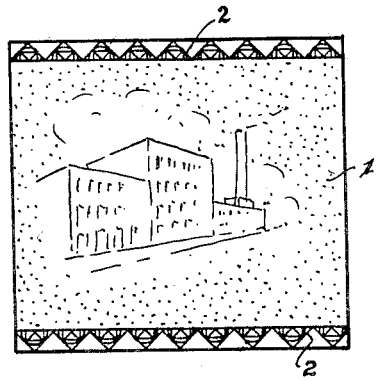
Fig. 2 is a view similar to Fig. 1, but showing the focus-facilitating design on portions of the negative which are outside of the exposure area of the photographic medium from which the negative was made.
Figure 3:
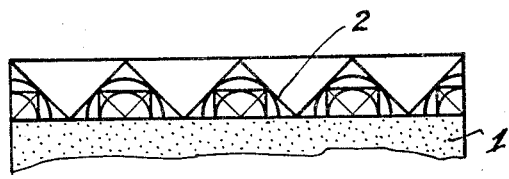
Fig. 3 is a view on an enlarged scale of the portions of the negative shown in Fig. 2.

In that form of the invention shown in Figs. 2 and 3 the focus-facilitating designs 2, which are similar in every respect to the designs 2 on the negative shown in Fig. 1, are formed adjacent the top and bottom edges of the negative, but outside the exposure area 1 thereof.

The forms of the invention illustrated in Figs. 1, 2 and 3 are especially adapted for use where the films are not synchronized with the numbers on the back of the film, but are exposed according to the length of the negative.

Figure 4:
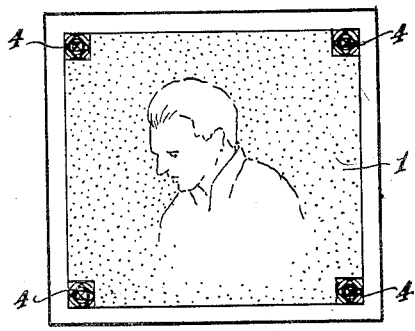
Fig. 4 is a view of a negative bearing a focus-facilitating design adjacent the corners thereof and within the exposure area of the photographic medium from which the negative was made.
Figure 5:
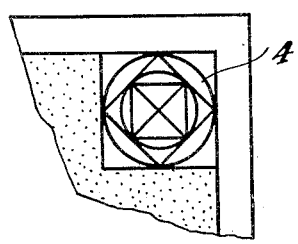
Fig. 5 is a view on an enlarged scale of a portion of the negative shown in Fig. 4.

In that form of the invention illustrated in Figs. 4 and 5 the designs or markings 4 are on the exposure area 1 of the negative as in Fig. 1, but are arranged adjacent only the corners of the negative instead of being continuous. These designs or markings are preferably about ¼ of an inch square. They may, however, be circular, in which case they will be about ¼ of an inch in diameter. This arrangement of the focus-facilitating designs is particularly adapted for use where the film is synchronized with the numbers on the back of the film.

Figure 6:
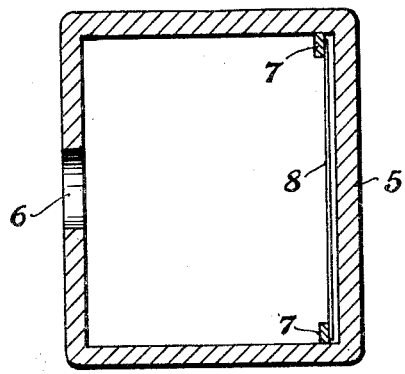
Fig. 6 is a cross-sectional view of a camera having grills built therein which are adapted to form focus-facilitating designs.

The designs may be placed on or incorporated in the negative in any desired manner, the only requirement in this connection being that they may be so prepared that exposure to light will not affect their legibility or sharpness.

Where the designs or focusing indicia lie within the exposure area, as in Figs. 1 and 4, the designs may be formed by printing or stamping the designs on portions of the exposure area of the photographic medium from which the negative is made, and which portions do not have the light-sensitive coating thereon, or they may be made by punching the designs in such medium at the points in question. They may also be formed on the photographic medium during exposure of the latter. In that case, the camera 5, having a lens opening 6, as shown in Fig. 6, will have built thereinto grills 7 bearing the designs in question which are placed in such a position forwardly of the top and bottom edges of the sensitized exposure area of said medium that when an exposure is made, the light of the exposure, acting through the grills will form the designs on such medium in the same manner that the photograph is formed.

Where the design or focusing indicia lie outside the exposure area, as in Figs. 2 and 3, the manner in which the designs are formed will depend on whether or not the portions of the photographic medium outside such exposure area are coated with a light-sensitive emulsion or left uncoated. If left uncoated, the designs may be formed by printing or stamping them at the desired points or by punching them in such medium at the desired points. If the medium is coated on portions outside the exposure area, the designs may be similarly applied before the coating is put on, since, in that event, the coating over the designs, not being exposed to light, will become transparent upon development, leaving the designs sharp and clear.

Where the focus-facilitating design is disposed adjacent the top and bottom edge of the negative, or where the design appears at each corner of the film, the design can be used to accurately check the parallelism of the enlarger, as by focusing any portion of the design and then observing if all of the designs which are projected are in focus. If all of the designs are not in focus, the elements of the enlarger or projector are not in parallel alignment and the necessary correction can then be made to overcome this defect in the enlarger.

As previously stated, the invention is especially useful in connection with negatives of great density or in negatives of very little density or contrast, both of these types being difficult to focus accurately and correctly.

Another advantage resides in the fact that if the focusing of the focus-facilitating design is accurate and the enlargement appears to finish out of focus, this determines that the negative itself is not in focus and that no more material need be wasted in trying to make enlargements. With small negatives it is difficult to determine before enlarging if the focus of the negative itself is sharp or not, and much material is wasted trying to make perfect enlargements from negatives which are entirely out of focus and which cannot produce good enlargements.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A photographic medium bearing a series of sharply defined elongate designs along each of two parallel edges thereof, said designs being adapted for focusing purposes, whereby a negative, made from said medium, may be quickly focused without the aid of auxiliary focus-facilitating devices.

2. An unexposed photographic medium having a portion adapted to be exposed to an image, said portion bearing a series of sharply defined designs along and within the upper and lower edges thereof, said designs being adapted for focusing purposes, whereby the negative may be quickly focused without the aid of auxiliary focusing devices.

LAWRENCE E. STONE.